US005402495A

United States Patent [19]

Kim

[11] Patent Number: 5,402,495

[45] Date of Patent: Mar. 28, 1995

[54] METHOD AND APPARATUS FOR EVALUATING AUDIO DISTORTION

[75] Inventor: Jong-il Kim, Incheon, Rep. of Korea

[73] Assignee: Daewoo Electronics Co., Ltd., Seoul, Rep. of Korea

[21] Appl. No.: 133,662

[22] Filed: Oct. 7, 1993

[30] Foreign Application Priority Data

Oct. 7, 1992 [KR] Rep. of Korea .................... 92-18387

[51] Int. Cl.[6] .............................................. H04B 15/00

[52] U.S. Cl. ........................................................ 381/94

[58] Field of Search ..................................... 381/94, 2

[56] References Cited

PUBLICATIONS

Bradenburg et al, Second Generation Perceptual Audio Coding: The Hybrid Coder, Presented at 88th Convention of Audio Eng. Soc., Mar. 13–16, 1990.

Johnston, Transform Coding of Audio Signals Using Perceptual Noise Criteria, IEEE Journal on Selected Areas in Communications, vol. 6, No. 2 Feb 1988.

Johnston, Estimation of Perceptual Entropy Using Noise Masking Criteria, IEEE 1988.

*Primary Examiner*—Forester W. Isen
*Attorney, Agent, or Firm*—William F. Pinsak

[57] ABSTRACT

There is provided an improved apparatus and method which include precisely adjustable digital circuitries employing psychoacoustic modeling so that the results obtained have a best consistency with actual human auditory perception. The apparatus comprises a first estimator for estimating a power density spectrum of an input digital audio signal to the audio system; a detector for determining a masking threshold depending on the power density spectrum of the input digital audio signal as an audible limit reflecting human auditory faculty; a second estimator for estimating a power density spectrum of an error signal representative of the difference between the input digital audio signal and its output digital audio signal from the audio system; and a third estimator for estimating the power density spectrum of the error signal which exceed the masking threshold and for calculating a perceptual spectrum distance(PSD) representative of the audio distortion.

3 Claims, 2 Drawing Sheets

METHOD AND APPARATUS FOR EVALUATING AUDIO DISTORTION

FIELD OF THE INVENTION

The present invention relates to a method and apparatus for evaluating an audio distortion in an audio system; and, more particularly, to an improved method and apparatus for providing the evaluation of an audio distortion consistent with actual human auditory perception.

DESCRIPTION OF THE PRIOR ART

An audio distortion measuring device is normally used to evaluate the performance of an audio system: for the performance or quality of an audio system is generally evaluated in terms of "distortions". The audio distortions are normally measured in terms of "Total Harmonic Distortion (THD)" and "Signal to Noise Ratios (SNR)", wherein said THD is a RMS(root-mean-square) sum of all the individual harmonic-distortion components and/or IMD's(Intermodulation Distortions) which consist of sum and difference products generated when two or more signals pass through an audio system, and said SNR represents the ratio, in decibels, of the amplitude of an input signal to the amplitude of an error signal.

However, such THD, IMD or SNR measurement is a physical measurement without having any direct bearing on the human auditory faculty or perception. As a result, it often happens that a listener judges a sound produced by an audio system having a greater THD (or less SNR) to be less distorted than the one having a lower THD (or greater SNR).

Consequently, various techniques or devices for realistically evaluating audio distortions have been proposed. One of such devices is disclosed in U.S. Pat. No. 4,706,290, which comprises a primary and a secondary networks for the measurement of loudspeaker subharmonics so that the results obtained will approximate the human auditory perception. However, as this apparatus serves to measure weighted harmonic distortions in time domain, the results do not best reflect how the human auditory faculty functions. Further, the apparatus has to employ various analog circuitries, rendering it rather difficult to precisely adjust the circuit parameters up to a desired level in, e.g., a high fidelity stereo system.

SUMMARY OF THE INVENTION

It is, therefore, an object of the invention to provide an improved method and apparatus comprising precisely adjustable digital circuitries based on the technique of psychoacoustic modeling so that the results obtained have a realistic consistency with actual human auditory perception.

In accordance with one aspect of the invention, there is provided an apparatus for evaluating an audio distortion in an audio system, which comprises: a first estimator for estimating a power density spectrum of an input digital audio signal to the audio system; a detector for determining a masking threshold depending on the power density spectrum of the input digital audio signal as an audible limit based on human auditory faculty; a second estimator for estimating a power density spectrum of an error signal representative of the difference between the input digital audio signal and its output digital audio signal from the audio system; and a third estimator for estimating the power density spectrum of the error signal which exceeds the masking threshold and for generating a perceptual spectrum distance representative of the audio distortion.

In accordance with another aspect of the invention, there is provided a method for evaluating an audio distortion in an audio system, which comprises the steps of: estimating a power density spectrum of an input digital audio signal to the audio system; determining a masking threshold depending on the power density spectrum of the input digital audio signal as its audible limit based on human auditory faculty; estimating a power density spectrum of an error signal representative of the difference between the input digital audio signal and its output digital audio signal from the audio system; and estimating the power density spectrum of the error signal which exceeds the masking threshold and generating a perceptual spectrum distance representative of the audio distortion.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
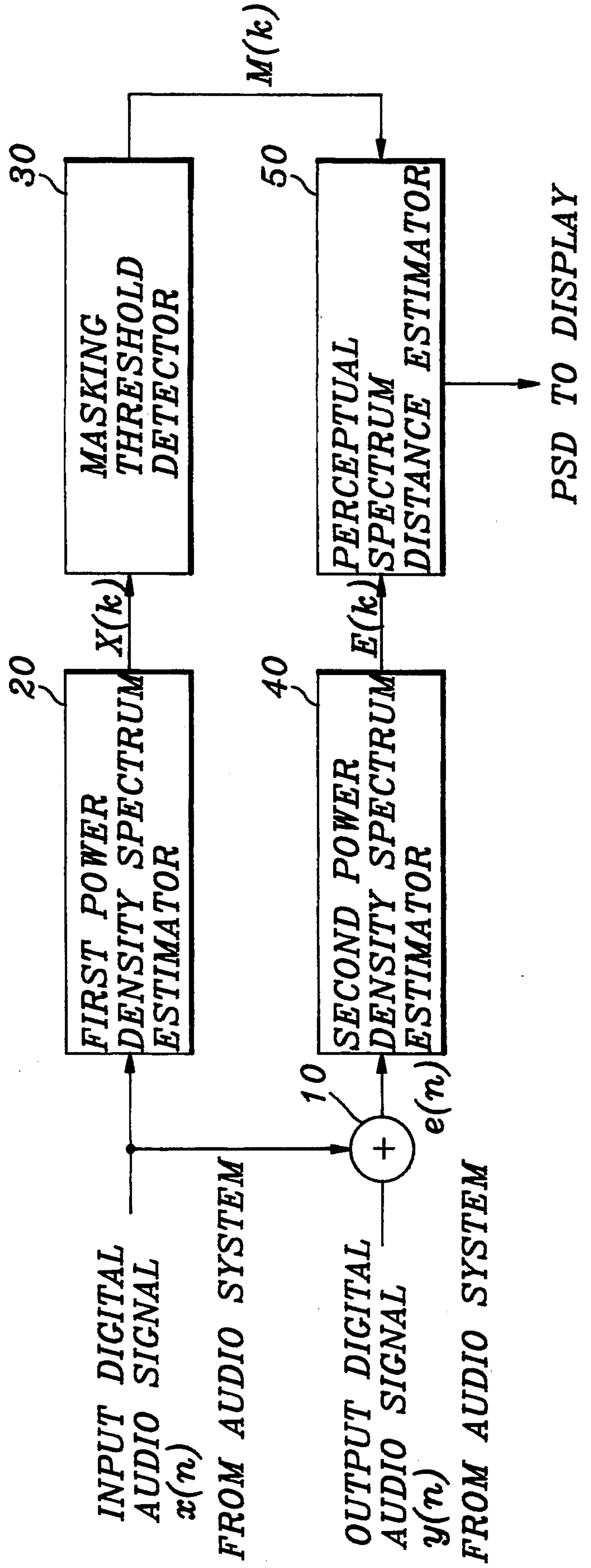
FIG. 1 is a schematic block diagram showing a novel apparatus for evaluating audio distortions in accordance with the present invention.

Referring to FIG. 1, the inventive apparatus includes a first and a second power density spectrum estimators 20 and 40, a masking threshold detector 30 and a perceptual spectrum distance estimator 50.

An input digital audio signal x(n) to an audio system(-not shown), which includes N samples, i.e., n=0,1,2, . . . N−1 is coupled to the first power density spectrum estimator 20 which serves to carry out Fast Fourier Transform conversion thereof from time to frequency domain and to generate a power density spectrum X(k) of the input digital signal, which as is well known in the art, is calculated as follows:

$$X(k) = \frac{1}{N}\left|\sum_{n=0}^{N} x(n)\cdot e^{-j\omega}\right| \quad (1)$$

wherein $\omega$ is $2\pi kn/N$, N is a positive integer, n=0,1,2 . . . , N−1 and k=0,1, . . . ,N−1.

The power density spectrum is then coupled to the masking threshold detector 30 which is adapted to detect a masking threshold depending on the power density spectrum of the input digital audio signal. The masking threshold represents an audible limit which is a sum of the intrinsic audible limit or threshold of a sound and an increment caused by the presence of another(-masking) sound and is proposed in an article, which is incorporated herein by reference, entitled "Coding of Moving Pictures and Associated Audio", *ISO/IEC/JTC1/SC29/WG11 NO501 MPEG* 93(July, 1993), wherein the so-called Psychoacoustic Models I and II are discussed for the calculation of the masking threshold. In a preferred embodiment of the present invention, Psychoacoustic Model I is advantageously employed in the masking threshold detector 30.

The masking threshold detected by the masking threshold detector 30 is then coupled to the perceptual spectrum distance estimator 50.

On the other hand, an output digital audio signal y(n) is coupled to an adder circuit 10 which serves to generate an error signal e(n) representative of the difference between the input and the output audio signals, which may be represented as follows:

$$e(n)=x(n)-y(n) \qquad (2)$$

The error signal is coupled to the second power density spectrum estimator 40 which is substantially identical to the first power density spectrum estimator 20 except that the power density spectrum E(k) of the error signal is calculated in the second estimator 40. Said power density spectrum E(k) may be obtained as follows:

$$E(k) = \frac{1}{N}\left|\sum_{n=0}^{N-1} e(n)\cdot e^{-j\omega}\right| \qquad (3)$$

wherein ω, N, n, k have the same meanings as previously defined.

The power density spectrum of the error signal is then coupled to the perceptual spectrum distance estimator 50 which is adapted to compare the power density spectrum of the error signal with the masking threshold and to generate a perceptual spectrum distance representative of the audio distortions as perceived by the human auditory faculty.

The perceptual spectrum distance is transmitted to a display device, e.g., a monitor or liquid crystal display, for its visual display to the user.

Figure 2:
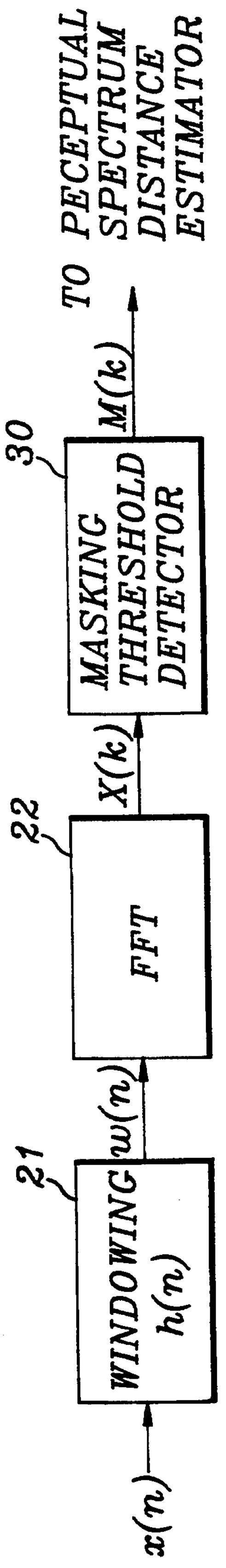
FIG. 2 is a detailed schematic block diagram depicting the power density spectrum estimator and the masking threshold detector shown in FIG. 1.

Turning now to FIG. 2, the first power density spectrum estimator 20 includes a windowing block 21 and a Fast Fourier Transform(FFT) block 22.

The windowing block 21 receives the input digital audio signal x(n); and, as is well known in the art, serves to window the input digital audio signal to compensate for the lack of spectral selectivity at low frequencies. The windowing process is carried out by multiplying the input digital audio signal with a predetermined weight factor. The predetermined weight factor h(n) may be represented as follows:

$$h(n) = \sqrt{8/3}\cdot 1/2\,\{1-\cos(2\pi n/N)\} \qquad (4)$$

wherein N and n have the same meanings as previously defined.

Accordingly, the output w(n) from the windowing block 21 may be represented as follows:

$$w(n)=x(n)\cdot h(n) \qquad (5)$$

The output w(n) from the windowing block 21 is then coupled to the FFT block 22 which serves to estimate the power density spectrum thereof; and, in a preferred embodiment of the present invention, includes a 512 point FFT for Psychoacoustic Model I. The power density spectrum of the input digital audio signal X(k) may be then obtained as follows:

$$X(k) = 10\log_{10}\left|\frac{1}{N}\sum_{n=0}^{N-1} w(n)\cdot e^{-j\omega}\right|^2 \qquad (6)$$

wherein ω, k, n and N are the same as previously defined.

The power density spectrum of the input digital audio signal X(k) calculated at the FFT block 22 is coupled to the masking threshold detector 30. As is described above, the masking threshold detector 30 is adapted to detect the masking threshold, M(k) depending on the power density spectrum of the input digital audio signal X(k). As previously discussed, the masking threshold as used herein represents the actual audible limit correctly reflecting the human auditory perception and calculated in accordance with Psychoacoustic Model I disclosed in the reference entitled "Coding of Moving Pictures and Associated Audio", *ISO/IEC/JTC1/SC29/WG11 NO501 MPEG* 93(July, 1993).

Referring back to FIG. 1, the second power density spectrum estimator 40 also includes a windowing block and a FFT block. Therefore, it should be appreciated that the power density spectrum of the error signal, E(k), can be obtained by weighting the error signal e(n) with the weight factor h(n) as is done for the input digital audio signal x(n) in Eq. (5).

The power density spectrum E(k) and the masking threshold M(k) are simultaneously coupled to the perceptual spectrum distance estimator 50 which serves to estimate a perceptual spectrum distance(PSD) representative of audio distortions. The PSD is represented may be follows:

$$PSD = \frac{1}{N}\sum_{k=0}^{N-1} \mathrm{MAX}[0,(E(k)-M(k))] \qquad (7)$$

wherein k and N have the same meanings as previously defined.

As can be seen from Eq. (7), the audio distortion is estimated by the power density spectrum of the error signal which exceeds the masking threshold, which best reflects human auditory faculty; and, therefore, the present invention yields a distortion measurement that is truly consistent with human auditory perception.

While the present invention has been shown and described with reference to the particular embodiments, it will be apparent to those skilled in the art many changes and modifications may be made without departing from the spirit and scope of the invention as defined in the appended claims.

What is claimed is:

1. An apparatus for evaluating an audio distortion in an audio system, wherein an input and an output audio signal from the audio system includes N samples, which comprises:

first estimation means for estimating a power density spectrum of the input digital audio signal to the audio system, wherein the first estimation means include means for windowing the input audio signal to compensate for the lack of spectral selectivity at low frequency regions thereof and the power density spectrum of the input digital audio signal, X(k), is determined as follows:

$$X(k) = 10 \log_{10} \left| \frac{1}{N} \sum_{n=0}^{N-1} w(n) \cdot e^{-j\omega} \right|^2$$

wherein N is a positive integer, w(n)=x(n)·h(n), x(n) is the input digital audio signal, ω is 2πkn/N, k=0,1,2, . . . , N−1and n=0,1,2, . . . , N−1, and a weight factor for the windowing means, h(n), is represented as follows: h(n)=√8/3·½{1−cos (2πn/N)};

means for determining a masking threshold depending on the power density spectrum of the input digital audio signal;

second estimation means for estimating a power density spectrum of an error signal representative of the difference between the input digital audio signal and its output digital audio signal from the audio system, wherein the second estimation means include means for windowing the error signal to compensate for the lack of spectral selectivity at low frequency regions thereof; and third estimation means for estimating a power density spectrum of the error signal which exceeds the masking threshold and for calculating a perceptual spectrum distance representative of the audio distortion, wherein the perceptual spectrum distance(PSD) is calculated as follows:

$$PSD = \frac{1}{N} \sum_{k=0}^{N-1} \mathrm{MAX}[0,(E(k) - M(k))]$$

wherein E(k) is the power density spectrum of the error signal, and M(k) is the masking threshold, k=0,1, . . . , N−1.

2. The apparatus as recited in claim 1, further comprising display means for visually displaying the perceptual spectrum distance.

3. A method for evaluating an audio distortion in an audio system, wherein an input and an output audio signal from the audio system include N samples, which comprises the steps of:

estimating a power density spectrum of the input digital audio signal to the audio system, wherein the step of estimating the power density spectrum includes the step of windowing the input audio signal to compensate for the lake of spectral selectivity at low frequency region thereof, and the power density spectrum of the input audio signal, X(k), is determined as follows:

$$X(k) = 10 \log_{10} \left| \frac{1}{N} \sum_{n=0}^{N-1} w(n) \cdot e^{-j\omega} \right|^2$$

wherein N is a positive integer, w(n)=x(n)·h(n), x(n) is the input digital audio signal, ω is 2πkn/N, k=0,1,2, . . . , N−1, n=0,1,2, . . . , N−1, and a weight factor, h(n), for the windowing step is represented as follows: h(n)=√8/3·½{1−cos (2πn/N)};

determining a masking threshold depending on the power density spectrum of the input audio signal;

estimating a power density spectrum of an error signal representative of the difference between the input digital audio signal and its output digital audio signal from the audio system, wherein the step of estimating the power density spectrum includes the step of windowing the error signal to compensate for the lake of pectral selectivity at low frequency region thereof; and estimating a power density spectrum of the error signal which exceeds the masking threshold and calculating a perceptual spectrum distance representative of the audio distortion wherein the perceptual spectrum distance(PSD) is calculated as follows:

$$PSD = \frac{1}{N} \sum_{k=0}^{N-1} \mathrm{MAX}[0,(E(k) - M(k))]$$

wherein E(k) is the power density spectrum of the error signal, M(k) is the masking threshold, i=0,1,2, . . . , N−1 and N is a positive integer.

* * * * *